Dec. 17, 1946.	G. W. McCOSHEN	2,412,901
TRIANGLE-OCTANT
Filed March 16, 1944
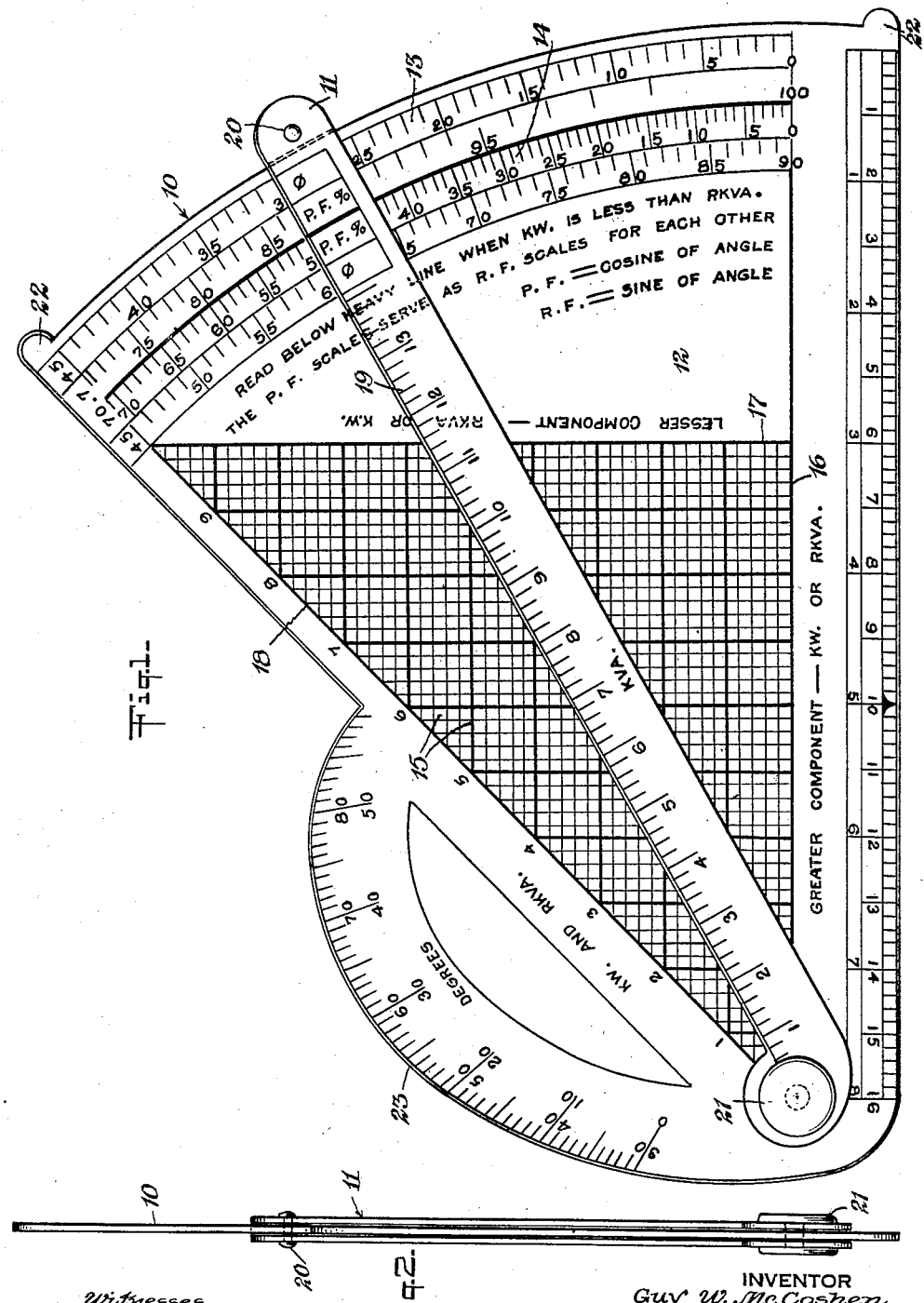
INVENTOR
Guy W. McCoshen Patented Dec. 17, 1946

2,412,901

UNITED STATES PATENT OFFICE 2,412,901

TRIANGLE-OCTANT

Guy W. McCoshen, Orange, N. J.

Application March 16, 1944, Serial No. 526,686

4 Claims. (Cl. 235—61)

This invention relates to a calculating device or instrument for ascertaining or determining values in connection with electrical devices, circuits and installations, etc.

The primary object of the invention is the provision of a calculator which may be used advantageously to quickly and easily find the values, with reasonable accuracy, associated with an A. C. circuit, namely, kilowatts, reactive-kilovolt-amperes, kilovolt-amperes, power factor, reactive factor, and angle between current and voltage, when the values of two of some of them are known.

The nature of the invention and its distinguishing features and advantages will appear when the following specification is read in conjunction with the accompanying drawing, in which—

Fig. 1 is a plan view of a device embodying the features of the invention.

Fig. 2 is a side elevational view of the device.

The device consists of a base 10 and an indicator or cursor 11 pivotally mounted on the base for movement with respect to the flat face 12 of the base.

The base 10 may be made of any suitable flat material, such as cardboard, Celluloid and the like. The base is segmental or of octant shape. On the face 12 there are printed arcuate scales 13 and 14, respectively, which are parallel to each other side-by-side, there being two sections to each scale which are numerically reversed to each other so that the base may be small. Also printed on the face 12 within a right angle triangular area, are lines 15 which intersect each other at right angles, said area being bounded by lines which represent base 16, altitude 17 and hypotenuse 18. The lines 15 are complemental to the scales 13 and 14 in making calculations.

The scales 13 and 14 serve as reactive factor scales for each other. When the kilowatt value is less than the reactive-kilovolt-ampere value scale 14 is read.

It is to be understood that abbreviations are used in marking the device as follows: kilowatts, kw.; reactive-kilovolt-amperes, rkva.; kilovolt-amperes, kva.; power factor, P. F.; reactive factor, R. F.; and angle between current and voltage, $\phi$.

The ordinals along the hypotenuse 18 denote base and altitude values in conjunction with the lines 15. The scale 19 on the indicator or cursor 11 denote hypotenuse or kilovolt-ampere values.

The subdivisions in the triangular area may be increased in number, where space permits, such as in size used in an office, so that they would have a value of .1, 1, 10, etc.

The indicator 11 may be made of any suitable material and consists of two similar elongated parts whose opposite longitudinal edges are straight and parallel to each other. The parts are disposed on opposite sides of the base and the outer ends are held together by a cross-pin 20 and the inner ends have holes to receive a pivot element 21 extending through the base 10. The base line 16 is struck radially with respect to the axis of the pivot 21. Projections 22 integral with the base limit the angular movement of the indicator 11 in opposite directions.

Instructions for using

*The triangle.*—The kw., rkva. and kva. are the triangle terms. The numbers on the fixed hypotenuse represent base and altitude values. The numbers on the indicator represent hypotenuse or kva. values.

The base or altitude may represent kw. or rkva., depending upon their values, the base representing the greater, and the altitude the lesser.

The numbered divisions of all triangle scales may be regarded as units, with subdivisions of .2; tens, with subdivisions of 2; hundreds, with subdivisions of 20, etc. Half, and even quarter values of the subdivisions are used as found by estimation. Sometimes it will be best to use double values for setting and take half values for results, or to use half values for setting and take double values for results; but in any particular solution all must be treated alike.

*The octant.*—The P. F., R. F., and $\phi$ are the octant terms. There are two sets of octant scales, upper and lower, separated by a heavy line. Either set will be idle insofar as P. F. and $\phi$ are concerned; but the idle P. F. scale becomes the R. F. scale, and the idle $\phi$ scale is disregarded. At 45° the 70.7% applies to both upper and lower scales, since the P. F. and R. F. are equal at that point.

Octant values are rigid as marked. They are not affected by altering the triangle values.

*Combining triangle and octant.*—If the values of two triangle terms, or those of a triangle and an octant term are known the values of the others will be found by one setting of the indicator.

In using the device it is necessary to remember that when kw. exceeds rkva., kw. will be in its conventional position, on the base, and P. F. will be on upper scale.

*Values of two triangle terms known, Example 1.*—A circuit is equipped with kw. and rkva. meters. They indicate 7,800 kw. and 5,400 rkva. Find the values of the other terms.

Treat the numbered divisions as thousands and the subdivisions as 200. The kw. is greatest and will be represented by the base. Set the indicator to the intersection of 7,800 on base and 5,400 on altitude. Read 9,500 kva. on indicator at this point. The P. F. and $\phi$ are on upper scales, and are 82% and 35°. The R. F. (idle P. F. scale) is 57%.

*Example 2.*—The nature of the load of Example 1 changes so that the meters indicate 5,400 kw. and 7,800 rkva. Find the values of the other terms.

The indicator setting will be the same as before. However the base now represents the rkva. The kva. will be the same as before, 9,500. The P. F. and $\phi$ are on lower scales, and are 57% and 55°. The R. F. (idle P. F. scale) is 82%.

*Values of a triangle and an octant term known, Example 3.*—A circuit is equipped with kva. and P. F. meters. They indicate 7,500 kva. and 92% P. F. Find the values of the other terms.

The P. F. is on upper scale, so kw. is on base. Set the indicator to 92% P. F. The $\phi$ is 23°. The R. F. is 39%. The 7,500 kva. on indicator marks the intersection of kw. and rkva. The kw. is 6,900, and the rkva. is 2,900.

*Example 4.*—A problem is given which states that a load has a rkva. of 6,600, which causes the current to lag 60° behind the voltage, and requires that the values of the other terms be found.

Set the indicator to 60°, and read 50% P. F. and 86.5% R. F. The kw. is on altitude because the P. F. is on lower scale. The 6,600 rkva. on base intersects the indicator at 7,600 kva., and at this point the kw. is 3,800.

*Solving complex problems, Example 5.*—The present load of a factory is 1,000 kva., at 84% P. R. lag. Expansion calls for an additional load of 610 kva., at 72% P. F. lag. What will the new kva. and P. F. be?

Treat the numbers as hundreds and the subdivisions as 20. By method of Example 3 find the kw. and rkva. of present and additional loads to be: 840 kw., 540 rkva. and 440 kw., 420 rkva., respectively.

Total kw.=840+440=1,280. Total rkva=540+420=960.

These values are not well suited to the triangle scales, so half values are used: 640 kw. and 480 rkva.

Set indicator to latter values and find 80% P. F. and 800 kva. Doubling the kva. gives 1,600 kva. for the new load, and its P. F. will be 80% lag.

*Example 6.*—The factory of Example 5 is fed by a 4,156 volt, 3 phase line. Therefore $$\text{New load current} = \frac{\text{kva.} \times 1{,}000}{E \times 1.732} = \frac{1{,}600 \times 1{,}000}{4{,}156 \times 1.732} = 222 \text{ amperes}$$

The qualities of the line are such as to make a 25 ampere reduction desirable. How much of the 960 rkva. must be neutralized by condensers to obtain this reduction in current? And what will the P. F. be then?

The 1,280 kw. must be retained.

$$\text{Reduced kva.} = \frac{E \times I \times 1.732}{1{,}000} = \frac{4{,}156 \times 197 \times 1.732}{1{,}000} = 1{,}418 \text{ kva.}$$

Set indicator to half values of kw. and kva., or to 640 kw. and 709, say 710 kva. Find 90% P. F., and 310 rkva. Doubling the latter gives 620 rkva.

The condensers must neutralize 960−620=340 rkva. The P. F. will be 90% lag.

NOTE.—The increasing length of the P. F. graduations toward 100% illustrates the impracticability of improving the P. F. much beyond 90%. The 340 rkva. of the condensers raised the P. F. from 80% to 90%, but it would require 620 rkva. of such to raise the P. F. from 90% to 100%.

The calculator having the features set forth may be used for solving problems of resistance, reactance and impedance, as well as those of their currents and voltages, by substituting their abbreviations for kw., rkva. and kva.

The opposite sides of the base 10 and indicator 11 provide ruling edges with various graduations, electrical and temperature conversion scales, wire table, resistance formula, and main functions of the triangle, affording maximum utilization in the electrical field. The base 10 is formed to provide a combination irregular curve finger grip and protractor 23.

I claim:

1. A calculator consisting of an octantal base, arcuate scales arranged parallel to each other on said base, lines intersecting each other at right angles within a right angle triangular area on said base, and a radial indicator connected with said base for movement with respect to said scales and lines, said indicator having a scale thereon cooperable with and complemental to said first scales and lines.

2. A calculator as defined in claim 1 wherein said indicator is pivoted and the base line of said triangular area is struck radially with respect to the axis of the indicator pivot.

3. A calculator as defined in claim 1, wherein ordinals in numerical order are placed along the hypotenuse of said triangular area to enumerate values in conjunction with said lines.

4. A calculator as defined in claim 1, wherein the radial indicator is pivoted at one corner of the base and wherein the other two corners of said base are provided with radial projections engageable by said indicator to limit the pivotal movement thereof.

GUY W. McCOSHEN.